United States Patent Office 3,441,389
Patented Apr. 29, 1969

3,441,389
POLYMERIC PRODUCTS OF $B_{10}H_{10}^=$ AND $B_{12}H_{12}^=$-CONTAINING COMPOUNDS
Seymour Yolles, Newark, Del., assignor to E. I. du Pont de Nemours and Company, Wilmington, Del., a corporation of Delaware
No Drawing. Continuation-in-part of application Ser. No. 455,949, May 14, 1965. This application Apr. 9, 1968, Ser. No. 719,852
Int. Cl. C01b 6/20, 21/06
U.S. Cl. 23—358       12 Claims

ABSTRACT OF THE DISCLOSURE

Polymers having structural formula characterized by at least one of the repeating units

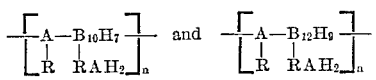

where A is nitrogen or phosphorus; R is hydrogen or $C_1$–$C_8$ alkyl and $n$ is 2–50; and hydrolyzates thereof.

---

This application is a continuation-in-part of my copending application Ser. No. 455,949 filed May 14, 1965 and now, abandoned.

This invention is directed to new polymeric products and more particularly to polymers of $B_{10}H_{10}^=$ and $B_{12}H_{12}^=$ compounds.

In accordance with this invention compounds of this type $(RAH_3)_2B_{10}H_{10}$ and $(RAH_3)_2B_{12}H_{12}$, which are referred to generically herein as $(RAH_3)_2$-boron cage compounds, are converted to polymers having the following repeating units, respectively:

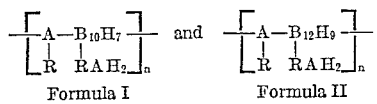

Formula I         Formula II where A is nitrogen or phosphorus, R is hydrogen or $C_1$–$C_8$ alkyl, and $n$ is a positive integer in the range from about 2 to 50, and preferably from 10 to 40. For example, compounds such as $(NH_4)_2B_{10}H_{10}$ and $(NH_4)_2B_{12}H_{12}$ are converted in accordance with this invention to polymers I and II, respectively, in which A is nitrogen R is hydrogen and $n$ is 2–50. $(CH_3NH_3)_2B_{10}H_{10}$ and $(CH_3NH_3)_2B_{12}H_{12}$ convert to polymers I and II, respectively, in which R is $CH_3$ and A is nitrogen. The corresponding phosphorus compounds $(CH_3PH_3)_2B_{10}H_{10}$ and $(CH_3PH_3)_2B_{12}H_{12}$ produce corresponding polymers I and II in which R is $CH_3$ and A is phosphorus. By using mixtures of $B_{10}$ and $B_{12}$ boron cage compounds as starting materials, polymers are produced containing repeating units of both Formula I and Formula II. Each of the polymers of this invention will normally be terminated with the end groups —$B_{10}H_9$–$^+AH_4$ or $B_{12}H_{11}$–$^+AH_4$ depending upon whether a $B_{10}$ or $B_{12}$ boron cage monomer is involved.

The above polymers are prepared by heating a compound of the formula $(RAH_3)_2B_{10}H_{10}$ or $(RAH_3)_2B_{12}H_{12}$ at a temperature of 200–400° C. for several hours, usually from about 4 to 10 hours. The pressure is not critical but the reaction proceeds more rapidly at super atmospheric pressure. Atmospheric pressure is usually preferred. The reaction is practically instantaneous at 400° C. and 19,000 atmospheres and proceeds with almost explosive violence. Preferably a temperature range of 250–300° C. and atmospheric pressure for a period of 4–10 hours is utilized. These boron cage compounds, if pure, require higher reaction temperatures than impure compounds for the same reaction rates.

Hydrogen gas is evolved during the reaction and sometimes small amounts of ammonia. The latter is usually evolved along with hydrogen when an impure boron cage compound is employed. Completion of the reaction is indicated when gas ceases to evolve or, in other words, when pressure in the reaction vessel, if it is closed, becomes constant. The polymers of this invention are mostly linear and are amorphous solids, partially soluble in water and dimethyl sulfoxide. Characterization of the structures of polymers of this invention is verified by infra-red and nuclear magnetic resonance techniques and conductometric titrations. These polymers can be hydrolyzed in water to remove $NH_3$ groups; the hydrolyzate will usually contain two $H_2O$ molecules per $B_{10}$ or $B_{12}$ boron cage unit in the polymer.

The hydrolyzate will have the structural formula:

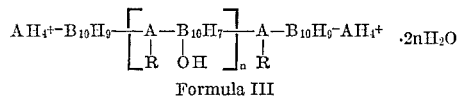

Formula III

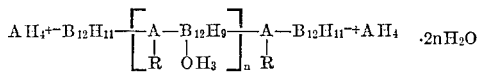

Formula IV where A, R, and $n$ are as defined above.

The following exemplary polymers are prepared in accordance with this invetnion from the reactants indicated:

| Reactant | Polymer |
|---|---|
| $(NH_4)_2B_{10}H_{10}$ | $-\!\!\left[\!\!\begin{array}{c}\text{NH}-\text{B}_{10}\text{H}_7-\\ \text{\textbar}\\ \text{NH}_3\end{array}\!\!\right]\!\!-$ |
| $(NH_4)_2B_{12}H_{12}$ | $-\!\!\left[\!\!\begin{array}{c}\text{NH}-\text{B}_{12}\text{H}_9-\\ \text{\textbar}\\ \text{NH}_3\end{array}\!\!\right]\!\!-$ |
| $(CH_3NH_3)_2B_{10}H_{10}$ | $-\!\!\left[\!\!\begin{array}{cc}\text{N}-&\!\!\!\text{B}_{10}\text{H}_7-\\ \text{\textbar}&\text{\textbar}\\ \text{CH}_3&\text{CH}_3\text{NH}_2\end{array}\!\!\right]\!\!-$ |
| $(CH_3NH_3)B_{12}H_{12}$ | $-\!\!\left[\!\!\begin{array}{cc}\text{N}-&\!\!\!\text{B}_{12}\text{H}_9-\\ \text{\textbar}&\text{\textbar}\\ \text{CH}_3&\text{CH}_3\text{NH}_2\end{array}\!\!\right]\!\!-$ |
| $(C_5H_{11}NH_3)_2B_{10}H_{10}$ | $-\!\!\left[\!\!\begin{array}{cc}\text{N}-&\!\!\!\text{B}_{10}\text{H}_7-\\ \text{\textbar}&\text{\textbar}\\ \text{C}_5\text{H}_{11}&\text{C}_2\text{H}_{11}\text{NH}_2\end{array}\!\!\right]\!\!-$ |
| $(C_5H_{11}NH_3)_2B_{12}H_{12}$ | $-\!\!\left[\!\!\begin{array}{cc}\text{N}-&\!\!\!\text{B}_{12}\text{H}_9-\\ \text{\textbar}&\text{\textbar}\\ \text{C}_5\text{H}_{11}&\text{C}_5\text{H}_{11}\text{NH}_2\end{array}\!\!\right]\!\!-$ |
| $(PH_3)_2B_{10}H_{10}$ | $-\!\!\left[\!\!\begin{array}{c}\text{PH}-\text{B}_{10}\text{H}_7-\\ \text{\textbar}\\ \text{PH}_3\end{array}\!\!\right]\!\!-$ |
| $(PH_3)_2B_{12}H_{12}$ | $-\!\!\left[\!\!\begin{array}{c}\text{PH}-\text{B}_{12}\text{H}_9-\\ \text{\textbar}\\ \text{PH}_3\end{array}\!\!\right]\!\!-$ |
| $(CH_3PH_3)_2B_{10}H_{10}$ | $-\!\!\left[\!\!\begin{array}{cc}\text{P}-&\!\!\!\text{B}_{10}\text{H}_7-\\ \text{\textbar}&\text{\textbar}\\ \text{CH}_3&\text{CH}_3\text{PH}_2\end{array}\!\!\right]\!\!-$ |
| $(CH_3PH_3)_2B_{12}H_{12}$ | $-\!\!\left[\!\!\begin{array}{cc}\text{P}-&\!\!\!\text{B}_{12}\text{H}_9-\\ \text{\textbar}&\text{\textbar}\\ \text{CH}_3&\text{CH}_3\text{PH}_2\end{array}\!\!\right]\!\!-$ |

Polymers of this invention are unique in having wholly inorganic backbones and containing high concentrations of boron and hydrogen atoms which have high neutron cross-sections. These polymers, therefore, are useful as neutron shielding materials and are substantially superior in performance in this respect to monomeric materials in that they can be used in the form of coatings and insoluble films which renders their application and utility more versatile than said monomeric materials. These polymers are also unique in possessing a high reducing potential which makes them suitable for use in redox ion exchange materials. Additionally due to their polymeric nature and reducing portion they are useful in batteries and fuel cells. These polymers also show good anti-static properties and can be applied to substrates calling for such properties. They can also be used as sequestering agents for heavy metals.

The following examples illustrate the invention.

Example 1

A 15.4 gm. sample of twice recrystallized

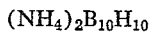

was placed in a glass liner and heated at atmospheric pressure in a bomb for 8 hours at 265° C. and an additional 4 hours at 300° C. The weight loss was 0.73 g. and the effluent gas was identified as hydrogen by the mass spectrometer. The product was identified as having the structure of Formula I where A is nitrogen and R is hydrogen. The molecular weight was about 2000.

A 12.95 gm. sample of the yellow pyrolysate was refluxed with 200 ml. of water for ¾ hour with evolution of ammonia. The solution was filtered hot and the insoluble precipitate was washed with boiling water. The filtrate was combined with washings and the solid which separated on cooling was also filtered off. Additional solid was obtained when the liquid volume was reduced. Finally, a solid is obtained on evaporating to dryness which is a hydrolyzate of the Formula I product and contains two molecules of water per $B_{10}$ cage unit.

Example 2

Following the procedure of Example 1, except that $(NH_4)_2B_{12}H_{12}$ was pyrolized and the pyrolyzate recovered and analyzed. The rate of the reaction was much slower than in Example 1. The product had the structural formula of Formula II where A is nitrogen and R is hydrogen. The molecular weight was about the same as in Example 1. This polymer upon hydrolysis loses $NH_3$ groups and adds two molecules of water per $B_{12}$-boron cage unit.

I claim:

1. A polymer having a structural formula characterized by at least one of the repeating units

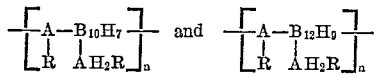

where A is selected from the group consisting of nitrogen and phosphorus; R is selected from the group consisting of hydrogen and $C_1$–$C_8$ alkyl; and $n$ is a positive integer in the range from about 2 to 50.

2. A polymer having the structural formula

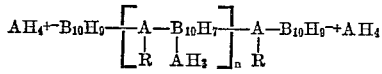

where A is selected from the group consisting of nitrogen and phosphorus; R is selected from the group consisting of hydrogen and $C_1$–$C_8$ alkyl; and $n$ is a positive integer in the range from about 2 to 50.

3. The polymer of claim 2 in which A is nitrogen.
4. The polymer of claim 2 in which R is $C_1$–$C_8$ alkyl.
5. The polymer of claim 4 in which R is hydrogen.
6. A polymer having the structural formula

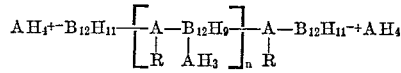

where A is selected from the group consisting of nitrogen and phosphorus; R is selected from the group consisting of hydrogen and $C_1$–$C_8$ alkyl; and $n$ is a positive integer in the range from about 2 to 50.

7. The polymer of claim 6 in which A is nitrogen.
8. The polymer of claim 6 in which R is a $C_1$–$C_8$ alkyl.
9. The polymer of claim 8 in which R is hydrogen.
10. A process for producing a polymer having a structural formula characterized by at least one of the repeating units

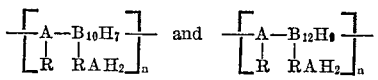

where A is selected from the group consisting of nitrogen and phosphorus; R is selected from the group consisting of hydrogen and $C_1$–$C_8$ alkyl; and $n$ is a positive integer in the range from about 2 to 50; said process comprising heating a compound selected from the group consisting of $(RAH_3)_2B_{10}H_{10}$ and $(RAH_3)_2B_{12}H_{12}$ at a temperature of about 200–400° C. for a time sufficient to produce said polymer and recovering said polymer from the reaction mixture.

11. A polymeric hydrolyzate having the structural formula characterized by the formula

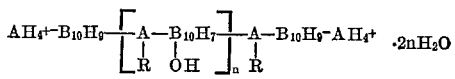

where A is selected from the group consisting of nitrogen and phosphorus; R is selected from the group consisting of hydrogen and $C_1$–$C_8$ alkyl; and $n$ is a positive integer in the range from about 2 to 50.

12. A polymeric hydrolyzate having the structural formula characterized by the formula

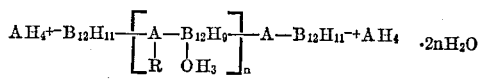

where A is selected from the group consisting of nitrogen and phosphorus; R is selected from the group consisting of hydrogen and $C_1$–$C_8$ alkyl; and $n$ is a positive integer in the range from about 2 to 50.

References Cited

UNITED STATES PATENTS

| | | | |
|---|---|---|---|
| 3,148,939 | 9/1964 | Knoth | 23—362 |
| 3,169,044 | 2/1965 | Miller et al. | 23—362 |

OSCAR R. VERTIZ, *Primary Examiner.*

HOKE S. MILLER, *Assistant Examiner.*

U.S. Cl. X.R.

23—315, 361, 362